United States Patent
Han et al.

(10) Patent No.: US 8,858,196 B2
(45) Date of Patent: Oct. 14, 2014

(54) HERMETIC COMPRESSOR

(75) Inventors: Jeongmin Han, Jinhae (KR); Hongseok Seo, Changwon (KR); Jaechan An, Busan (KR); Keunju Lee, Changwon (KR); Jeonghun Kim, Jinhae (KR)

(73) Assignee: LG Electronics Inc., Seoul (KR)

( * ) Notice: Subject to any disclaimer, the term of this patent is extended or adjusted under 35 U.S.C. 154(b) by 634 days.

(21) Appl. No.: 13/077,020

(22) Filed: Mar. 31, 2011

(65) Prior Publication Data

US 2011/0250082 A1    Oct. 13, 2011

(30) Foreign Application Priority Data

Apr. 13, 2010    (KR) .................. 10-2010-0033985

(51) Int. Cl.
| | | |
|---|---|---|
| *F04C 2/00* | (2006.01) | |
| *F04C 18/48* | (2006.01) | |
| *F04C 18/356* | (2006.01) | |
| *F04C 23/00* | (2006.01) | |
| *F04C 29/00* | (2006.01) | |
| *F01C 21/02* | (2006.01) | |

(52) U.S. Cl.
CPC ............. *F04C 18/356* (2013.01); *F04C 23/008* (2013.01); *F04C 2240/50* (2013.01); *F04C 29/0057* (2013.01); *F01C 21/02* (2013.01); *F04C 2240/60* (2013.01); *Y10S 417/902* (2013.01)
USPC ....................................... 417/410.3; 417/902

(58) Field of Classification Search
USPC .............................................. 417/410.3, 902
See application file for complete search history.

(56) References Cited

U.S. PATENT DOCUMENTS

| 2,137,962 | A | * | 11/1938 | Weiher ......................... 417/363 |
|---|---|---|---|---|
| 4,137,014 | A | * | 1/1979 | Parker ........................... 417/326 |
| 6,283,729 | B1 | * | 9/2001 | Makino et al. ............... 417/410.3 |
| 7,540,724 | B2 | * | 6/2009 | Ogasawara et al. ......... 417/410.3 |
| 7,802,972 | B2 | * | 9/2010 | Shimizu et al. .............. 417/410.3 |
| 8,162,626 | B2 | * | 4/2012 | Fukasaku et al. ........... 417/410.1 |

FOREIGN PATENT DOCUMENTS

| CN | 1896528 | 1/2007 |
|---|---|---|
| CN | 101529098 | 9/2009 |
| JP | H08-47207 | 2/1996 |
| JP | H10-89252 | 4/1998 |
| JP | H10-159771 | 6/1998 |

OTHER PUBLICATIONS

Chinese Office Action dated May 20, 2013.

* cited by examiner

*Primary Examiner* — Charles Freay
*Assistant Examiner* — Christopher Bobish
(74) *Attorney, Agent, or Firm* — Ked & Associates, LLP

(57) ABSTRACT

A compression device a rotor and stator in a case, a shaft coupled to the rotor, and a compressor coupled to the shaft to suction, compress, and discharge refrigerant within the case. At least one bearing is used to support the shaft, and the shaft has a diameter that is 0.114 times equal to or larger than and 0.138 times equal to or smaller than an outer diameter of the stator at at least one reference position.

9 Claims, 4 Drawing Sheets

HERMETIC COMPRESSOR

CROSS-REFERENCE TO RELATED APPLICATION

Pursuant to 35 U.S.C. §119(a), this application claims the benefit of the earlier filing date and right of priority to Korean Application No. 10-2010-0033985, filed on Apr. 13, 2010, the contents of which is incorporated herein by reference.

BACKGROUND

1. Field

One or more embodiments described herein relate to a compressor.

2. Background

A hermetic compressor generally includes a motor for generating a driving force in an inner space of a hermetic case, and a compression part coupled to the motor for compressing a refrigerant. The hermetic compressors may be classified as a reciprocal type, a scroll type, a rotary type, a vibration type and the like according to a refrigerant compression mechanism. The reciprocal type, the scroll type and the rotary type use a rotational force of the motor, while the vibration type uses a reciprocal motion of the motor part.

Among those hermetic compressors, the motor of the hermetic compressor using the rotational force has a crank shaft to transfer the rotational force of the motor to the compression part. For example, the motor of the rotary type hermetic compressor (hereinafter, referred to as a rotary compressor) includes a stator fixed to the hermetic case, a rotor inserted in the stator with a predetermined gap therebetween to be rotatable by interaction with the stator, and a crank shaft coupled to the rotor to transfer the rotational force of the rotor to the compression part.

The compression part includes a cylinder, a rolling piston and a vane for compressing a refrigerant in the cylinder, and a plurality of bearing members for defining a compression space together with the cylinder and supporting the crank shaft. The bearing members are typically located at one side of the motor to support the crank shaft. However, as compressors becomes highly efficient in recent time, a technology of minimizing compressor vibration by installing bearings at both upper and lower ends of the crank shaft.

However, when the bearings are installed at the upper and lower ends of the crank shaft as shown in the related art rotary compressor, a diameter of the crank shaft should be short to reduce a frictional loss and improve efficiency of the compressor. If the diameter of the crank shaft becomes longer due to an increase in the capacity of the compressor, a bearing surface increases, which causes the frictional loss to be increased and the efficiency of the compressor to be lowered. Furthermore, if the diameter of the crank shaft is too short, the crank shaft may buckle or get bent to lower reliability of the compressor.

DETAILED DESCRIPTION

Figure 1:
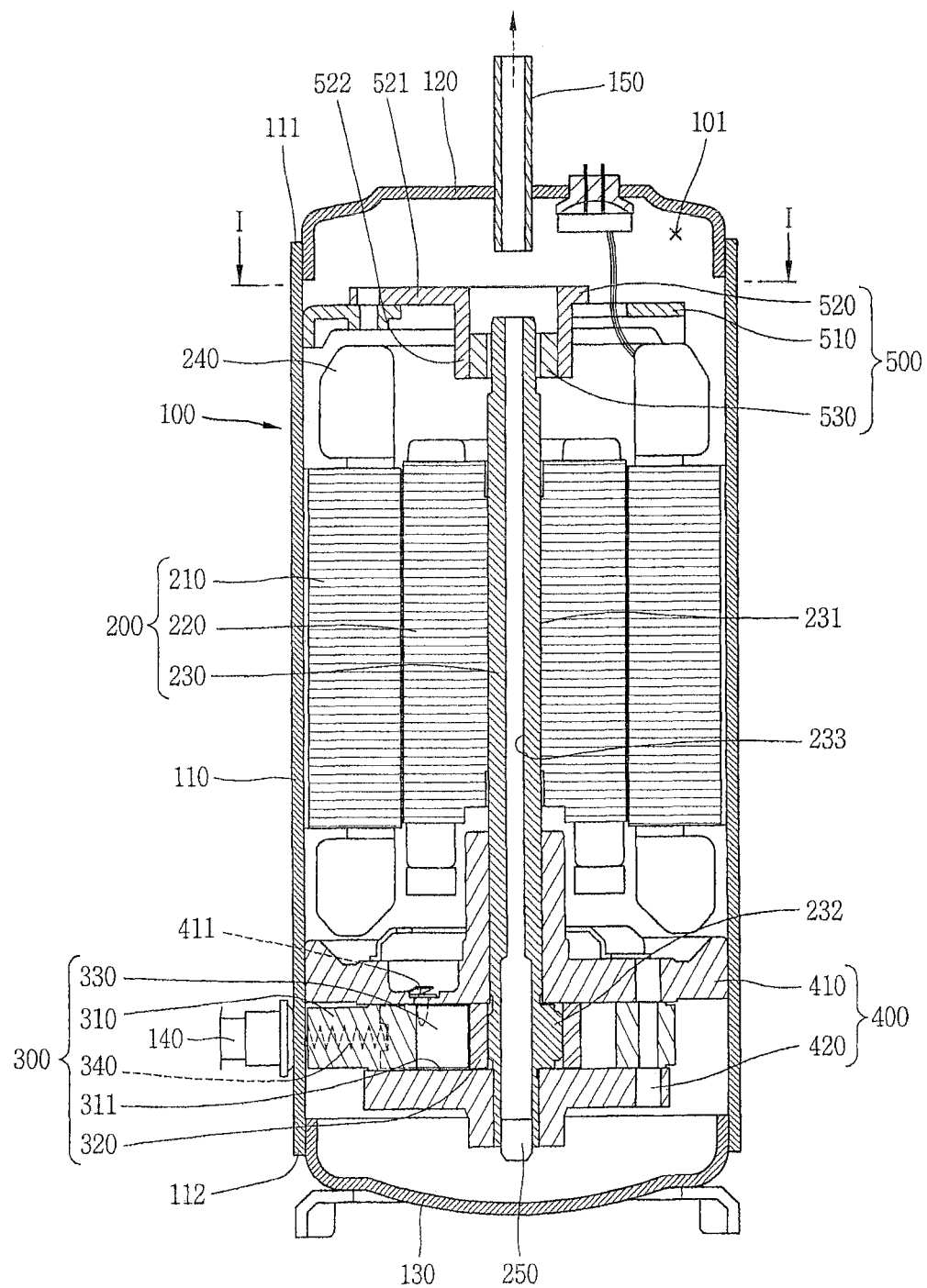
FIG. 1 shows an interior of one embodiment of a rotary compressor.
Figure 2:
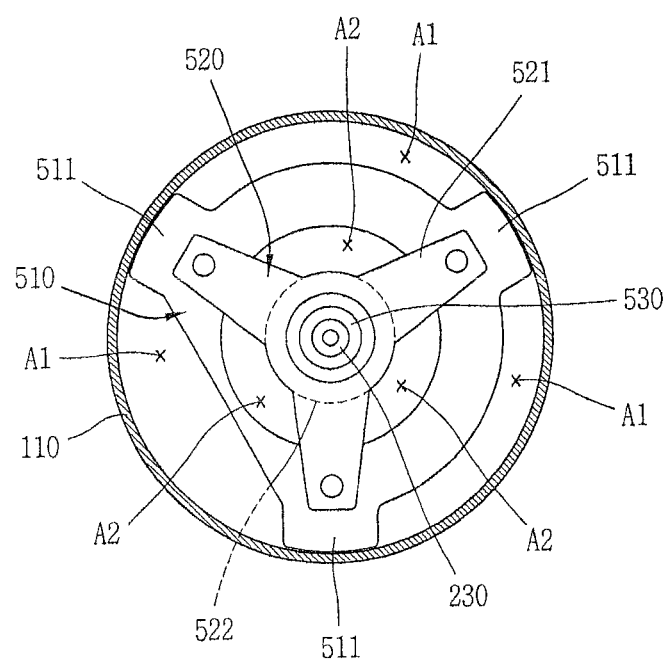
FIG. 2 shows a sectional view taken along the line I-I in FIG. 1.
Figure 3:
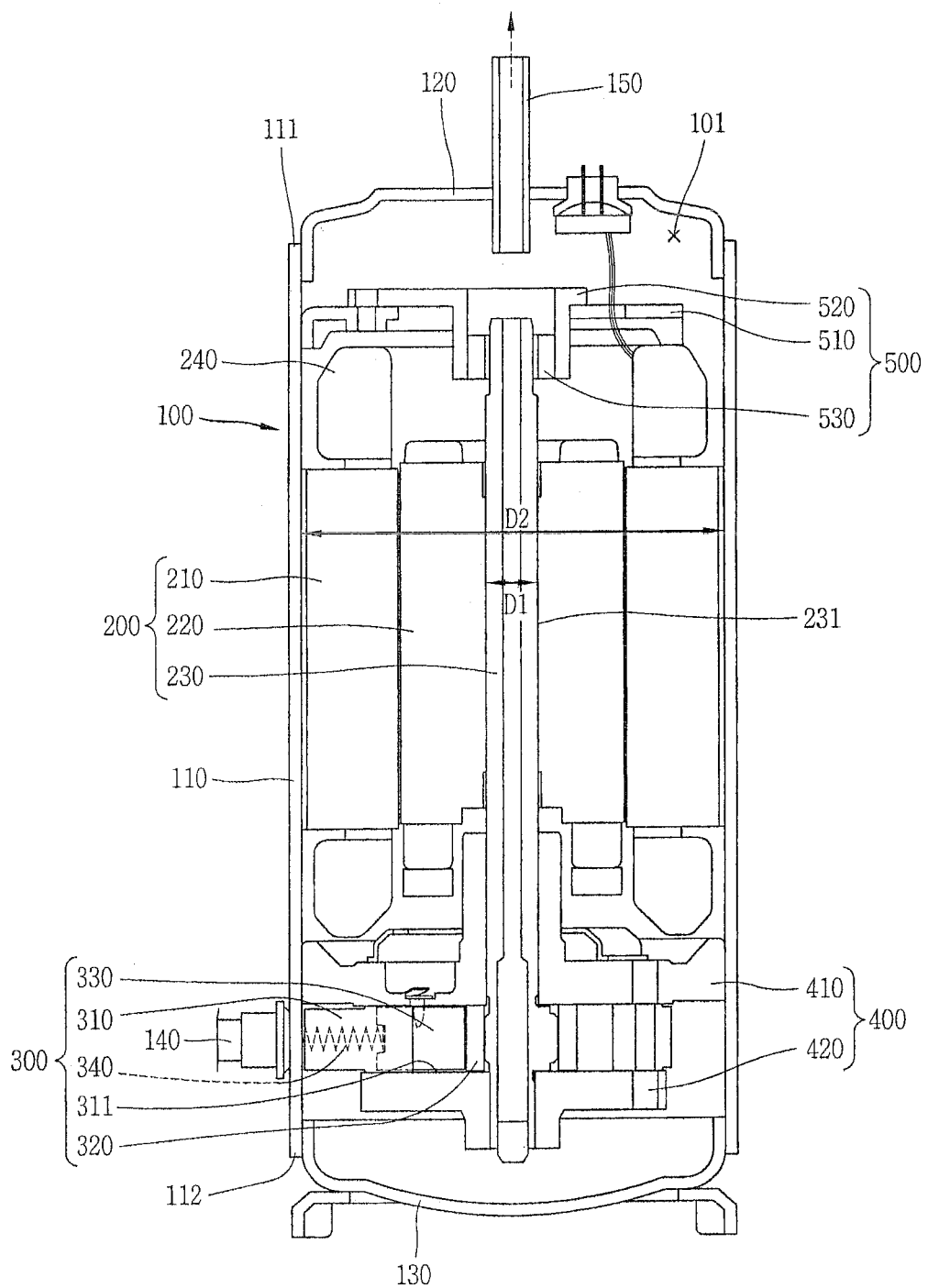
FIG. 3 shows an outer diameter of a stator and a diameter of a crank shaft in the rotary compressor of FIG. 1.

FIG. 1 shows a longitudinal sectional view showing an interior portion of a rotary compressor, and FIG. 2 is a sectional view taken along the line I-I of FIG. 1.

As shown in FIGS. 1 and 2, a rotary compressor may include a motor 200 located at an upper side of an inner space 101 of a hermetic case 100 for generating a driving force, a compression part located at a lower side of the inner space 101 of the hermetic case 100 for compressing a refrigerant using the driving force generated from the motor 200, and a first bearing 400 and a second bearing 500 installed at lower and upper sides of the motor 200 for supporting a crank shaft 230 to be explained later.

The hermetic case 100 may include a case main body 110 having the motor 200 and the compression part 300 installed therein, an upper cap (hereinafter, referred to as a first cap) 120 for covering an upper open end (hereinafter, referred to as a first opening) 111 of the case main body 110, and a lower cap (hereinafter, referred to as a second cap) 130 for covering a lower open end (hereinafter, referred to as a second open end) 112 of the case main body 110.

The case main body 110 may have a cylindrical shape. A suction pipe 140 may be penetratingly coupled to a principal surface of a lower side of the case main body 110. The suction pipe 140 may be directly connected to an inlet (not shown) located at a cylinder 310, which will be explained later.

An edge of the first cap 120 may be bent to be welded to the first opening 111 of the case main body 110. A discharge pipe 150 for guiding a refrigerant discharged from the compression part 300 into the inner space 101 of the hermetic case 100 to a refrigeration cycle may be penetratingly coupled to the center of first cap 120.

A edge of the second cap 130 may be bent to be welded to the second opening 112 of the case main body 110.

The motor 200 may include a stator 210 shrink-fitted to an inner circumferential surface of the hermetic case 100, a rotor 220 rotatably disposed inside the stator 210, and a crank shaft 230 shrink-fitted to the rotor 220 and thusly rotating together with the rotor 220 so as to transfer a rotational force of the motor 200 to the compression part 300.

The stator 210 may be formed by laminating a plurality of stator sheets by a predetermined height, and teeth disposed along its inner circumferential surface are wound with a coil 240.

The rotor 220 may be located at the inner circumferential surface of the stator 210 with a predetermined gap therebetween, and the crank shaft 230 may be shrink-fitted in the center of the rotor 220 to be integrally coupled to the rotor 220.

The crank shaft 230 may include a shaft portion 231 coupled to the rotor 220, and an eccentric portion 232 eccentrically formed at a lower end of the shaft portion 231 and coupled with a rolling piston 320, which will be explained later. An oil passage 233, through which oil within the hermetic case 100 is sucked up, may be formed through the crank shaft 230 in an axial direction.

The compression part 300 may include a cylinder 310 installed in the hermetic case 100, a rolling piston 320 rotatably coupled to the eccentric portion 232 of the crank shaft 230 for compressing a refrigerant with orbiting in a compression space of the cylinder 310, a vane 330 movably coupled to the cylinder 310 in a radial direction such that a sealing surface of one side thereof contacts an outer circumferential surface of the rolling piston 320 to partition the compression space of the cylinder 310 into a suction chamber and a discharge chamber, and a vane spring 340 implemented as a compression spring for elastically supporting the rear side of the vane 330.

The cylinder 310 may have an annular shape. An inlet (not shown) connected to the suction pipe 140 may be formed at one side of the cylinder 310, and a vane slot 311, into which the vane 330 is slid, may be formed at one side of the inlet in a circumferential direction. A discharge guiding groove (not shown), which communicates with an outlet 411 located at an upper bearing 410 to be explained later, may be formed at one side of the vane slot 311 in a circumferential direction.

The first bearing 400 may include an upper bearing 410 for cover the upper side of the cylinder 310 and simultaneously supporting the crank shaft 230 in an axial direction and a radial direction by being welded to the hermetic case 100, and a lower bearing 420 for covering the lower side of the cylinder 310 to support the crank shaft 230 in the axial direction and the radial direction.

The second bearing 500 may include a frame 510 welded onto the inner circumferential surface of the hermetic case 100 above the stator 210, and a housing 520 coupled to the frame 510 so as to be rotatably coupled to the crank shaft 230.

The frame 510 may be formed in an annular shape, and have fixing protrusions 510 protruding from an outer circumferential surface thereof by predetermined lengths to be welded onto the case main body 110. The fixing protrusions 511 may have an approximately 120° interval from one another along a circumferential direction.

The housing 520 may include support protrusions 521 with an approximately 120° interval from one another so as to be supported at three points of the frame 510. A bearing protrusion 522 may downwardly protrude from the center of the housing 520. A bearing member, such as a bearing bush 530 or a ball bearing (not shown), in which an upper end of the crank shaft 230 can be inserted to be supported, may be mounted in the bearing protrusion 522 to be coupled thereto.

Also, the support protrusions 521, as shown in FIG. 2, may be provided in the same number as the fixing protrusions 511, thus to be fixed to overlapped positions with the fixing protrusions 511, thereby enhancing stability of the second bearing 520. Reference numeral 250 denotes an oil feeder.

The rotary compressor having such configuration will operate as follows.

When power is applied to the stator 210 of the motor 200 to rotate the rotor 220, the crank shaft 230 rotates with both ends thereof being supported by the first bearing 400 and the second bearing 500. The crank shaft 230 thus transfers a rotational force of the motor 200 to the compression part 300. The rolling piston 320 in the compression part 300 then eccentrically rotates in the compression space. Accordingly, the vane 330 forms a compression space together with the rolling piston 320 to compress a refrigerant. The compressed refrigerant is then discharged into the inner space 101 of the hermetic case 100.

Here, the crank shaft 230 rotates fast such that the oil feeder 250 located below the crank shaft 230 pumps up oil contained in an oil storage of the hermetic case 100. The oil is then sucked up via the oil passage 233 of the crank shaft 230 to lubricate each bearing surface.

However, as the lower and upper ends of the crank shaft 230 are coupled to the first and second bearing 400 and 500, respectively, to be supported in a journal direction, a frictional loss may increase upon rotation of the crank shaft 230. In consideration of this, the diameter of the crank shaft 230 may be reduced to decrease the frictional loss at the first and second bearings 400 and 500 upon the rotation of the crank shaft 230.

In this case, preferably, when the diameter D1 of the crank shaft 230 is 0.114 times larger than or equal to an outer diameter D2 of the stator 210 or 0.138 times smaller than or equal to the same, buckling or bending of the crank shaft 230 can be minimized (prevented) and the frictional loss thereof can be reduced. Here, the diameter D1 of the crank shaft 230 is defined by regarding a range that the shaft portion 231 of the crank shaft 230 is inserted in the rotor 220 to contact each other, namely, the length that the shaft portion 231 of the crank shaft is the inserted in the rotor 220, as a reference position.

Figure 4:
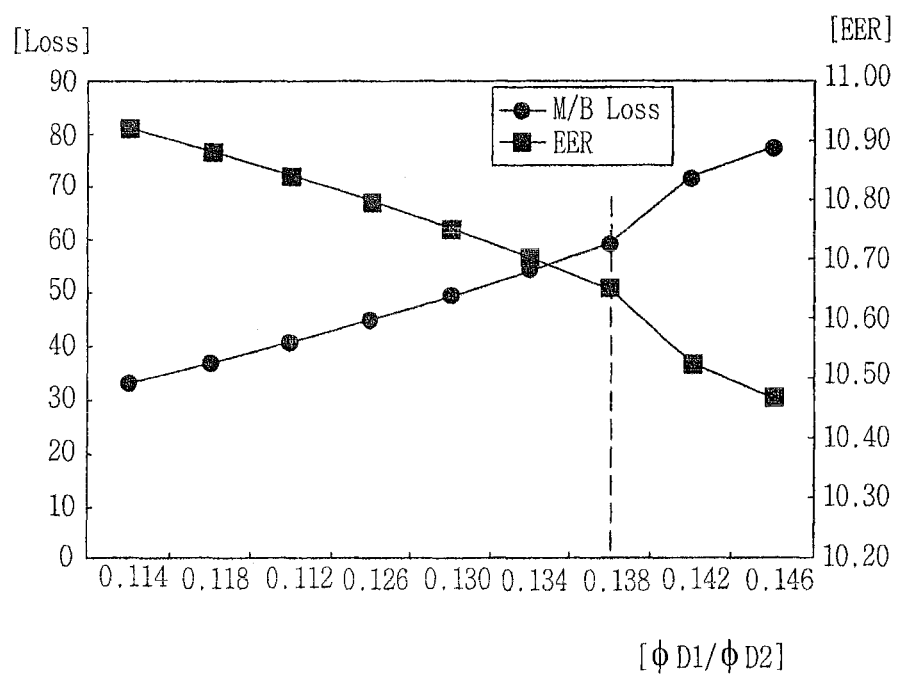
FIG. 4 shows frictional loss between the crank shaft and bearings of a compressor, obtained by comparing various diameters of the crank shaft and a predetermined outer diameter of the stator, in the rotary compressor of FIG. 1.

FIG. 4 is a graph showing a frictional loss between the crank shaft and the bearings and the thusly-caused change of a compressor performance, which are observed by comparing various diameters of the crank shaft with a predetermined outer diameter of the stator in the rotary compressor of FIG. 1. A frictional loss of the first bearing 400 will be calculated according to the following equation:

$$Lmb = \omega * fmb * Fmb$$

Here, Lmb denotes a frictional loss of the first bearing 400, ω denotes an angular velocity, rmb denotes a radius of the first bearing 400, fmb denotes a frictional coefficient of the first bearing 400, and Fmb denotes a weight applied to first bearing 400.

According to the equation, it can be noticed that when the diameter D1 of the crank shaft 230 becomes thicker, the friction loss can increase more and the compressor performance can be lowered more. Especially, it can be observed that the frictional loss significantly increases and compressor performance is drastically lowered, starting from the point that a diameter ratio (D1/D2) of the diameter D1 of the crank shaft 230 to the outer diameter D2 of the stator 21 is 0.138. Consequently, the diameter ratio (D1/D2) of the diameter D1 of the crank shaft 230 to the outer diameter D2 of the stator 210 may be smaller than or equal to approximately 0.138, which may allow the frictional loss and the compressor performance to be controlled within appropriate ranges.

In addition, when the diameter ratio (D1/D2) of the diameter D1 of the crank shaft 230 to the outer diameter D2 of the stator 210 is greater than or equal to 0.114, the rigidity of the crank shaft 230 can be maintained. If the ratio (D1/D2) is lower than 0.114, the crank shaft 230 may have an extremely thin diameter D1 to be buckled or bent, which may result in drastically lowering reliability of the compressor and the compressor performance.

In the meantime, even when a plurality of upper and lower compression parts are installed, the diameter of the crank shaft may be within the same range as the foregoing description. Also, the thusly-obtained operational effects can be the same or similar to the foregoing description.

Therefore, an aspect of the detailed description is to provide a hermetic compressor capable of maintaining an appropriate rigidity of the crank shaft and reducing a frictional loss between the crank shaft and bearing surfaces to thus enhance efficiency of the compressor in case where the crank shaft is supported by journal bearings at both upper and lower sides thereof.

To achieve the aspect in accordance with the purpose of this specification, as embodied and broadly described herein, a hermetic compressor may include a hermetic case, a stator secured with an inner space of the hermetic case, a rotor rotatably disposed within the stator, a crank shaft coupled to the rotor, a compression part coupled to the crank shaft to suck up and compress a refrigerant and discharge the compressed refrigerant into the inner space of the hermetic case, and bearings configured to support the crank shaft in a journal direction, wherein the crank shaft is configured such that a diameter thereof is 0.114 times larger than or equal to or 0.138 time smaller than or equal to an outer diameter of the stator at at least one reference position in an axial direction.

To achieve the aspect in accordance with the purpose of this specification, as embodied and broadly described herein, a hermetic compressor may include a hermetic case, a stator secured with an inner space of the hermetic case, a rotor rotatably disposed within the stator, a crank shaft coupled to the rotor, a compression part coupled to the crank shaft to suck up and compress a refrigerant and discharge the compressed refrigerant into the inner space of the hermetic case, a first bearing coupled to the compression part to be secured with the hermetic case and configured to support a first portion of the crank shaft based upon the rotor, and a second bearing secured with the hermetic case and configured to support a second portion of the crank shaft, an opposite portion to the first portion, based upon the rotor, wherein the crank shaft is configured such that a diameter thereof is 0.114 times larger than or equal to or 0.138 times smaller than or equal to an outer diameter of the stator.

In accordance with one embodiment, a compression device comprises a case; a stator within the case; a rotor within the stator; a crank shaft coupled to the rotor; a compressor coupled to the crank shaft to suction and compress a refrigerant and to discharge the compressed refrigerant into an interior of the case; and at least one bearing to support the crank shaft, the crank shaft having a diameter that is 0.114 times equal to or larger than or 0.138 times equal to or smaller than an outer diameter of the stator at at least one reference position in an axial direction. The reference position may substantially correspond to a location where the crank shaft is coupled to the rotor or another position along the shaft.

The bearings may comprise a first bearing, coupled to the compressor, to support a first portion of the crank shaft; and a second bearing to support a second portion of the crank shaft spaced from the first portion. The rotor and stator may be located between the first and second portions of the crank shaft.

In addition, the device may include an oil storage area within the case, wherein a passage to guide the oil pumped up from the oil storage area toward the second bearing is included through the crank shaft in the axial direction.

In addition, a difference between the outer diameter of the stator and an interior diameter of the case may be less than 10% of the interior diameter of the case. In another embodiment, the difference between the outer diameter of the stator and the interior diameter of the case is less than 5% of the interior diameter of the case.

In addition, the diameter of the crankshaft may be substantially constant from a first end of the stator to a second end of the stator, and the diameter of the outer diameter of the stator is substantially constant from the first end to the second end of the stator.

In accordance with another embodiment, a compression device comprises a case; a stator within the case; a rotor within the stator; a crank shaft coupled to the rotor; a compressor, coupled to the crank shaft, to suction and compress a refrigerant and to discharge the compressed refrigerant into the case; a first bearing, coupled to the compressor, to support a first portion of the crank shaft; and a second bearing to support a second portion of the crank shaft spaced from the first portion, wherein the crank shaft has a diameter that is 0.114 times equal to or larger than or 0.138 times equal to or smaller than an outer diameter of the stator.

The compressor may comprise a cylinder coupled to the first bearing, the cylinder forming a compression space together with the first bearing; a rolling piston coupled to the crank shaft to perform an orbiting motion within the compression space of the cylinder; and a vane to partition the compression space into a suction chamber and a discharge chamber and linearly moving responsive to orbiting of the rolling piston.

The first bearing may include a plurality of bearing plates coupled to upper and lower sides of the cylinder shielding the compression space, and the second bearing may comprise a frame coupled to an inner circumferential surface of the case at one side of the stator; and a housing coupled to the frame to rotatably support the crank shaft, wherein a plurality of first protrusions are located at an outer circumferential surface of the frame and coupled to the inner circumferential surface of the case, and wherein a plurality of second protrusions are located at an outer circumferential surface of the housing for support at the frame.

In addition, a bearing protrusion may be located at a center of the housing, and a bearing member is mounted in the bearing protrusion such that the crank shaft is inserted therein to be supported. Also, a number of the first protrusions may equal a number of second protrusions, and the first protrusions and the second protrusions may overlap each other. Also, a passage to guide oil pumped from an oil storage of the case toward the second bearing may be included through the crank shaft in an axial direction.

In accordance with another embodiment, a compression device comprises a case; a motor in the case; a shaft coupled to the motor; and a compressor coupled to the shaft to compress liquid in the case, wherein a difference between an outer diameter of the motor and an interior diameter of the case is less than 10% of the interior diameter of the case, and wherein a diameter of the shaft is 0.114 times equal to or larger than or 0.138 times equal to or smaller than the outer diameter of a stator of the motor at at least one reference position.

The difference between an outer diameter of the stator of the motor and the interior diameter of the case may be less than 10% of the interior diameter of the case. In another embodiment, the difference between the outer diameter of the stator of the motor and the interior diameter of the case is less than 5% of the interior diameter of the case. In addition, the diameters of the shaft and stator may be substantially constant from a first end of the stator to a second end of the stator.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. The features of one or more embodiments may be combined with the features of the remaining embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A compression device, comprising:
    a case;
    a stator within the case;
    a rotor within the stator;
    a crank shaft coupled to the rotor;
    a compressor, coupled to the crank shaft, to suction and compress a refrigerant and to discharge the compressed refrigerant into the case;
    a first bearing, coupled to the compressor, to support a first portion of the crank shaft; and
    a second bearing to support a second portion of the crank shaft spaced apart from the first portion,
        wherein a diameter of the crank shaft is greater than or equal to 0.114 times an outer diameter of the stator, and
        wherein the diameter of the crank shaft is less than or equal to 0.138 dines the outer diameter of the stator,
    wherein the compressor comprises:
        a cylinder coupled to the first bearing, the cylinder forming a compression space together with the first bearing;
        a rolling piston coupled to the crank shaft to perform an orbiting motion within the compression space of the cylinder; and
        a vane to partition the compression space into a suction chamber and a discharge chamber and linearly moving in response to the orbiting of the rolling piston, and
    wherein the second bearing comprises:
        a frame welded onto an inner circumferential surface of the case at one side of the stator;
        a housing coupled to the crank shaft so as to allow for rotation of the crank shaft, the housing being detachably coupled to the frame;
        a plurality of first protrusions located on an outer circumferential surface of the frame, the plurality of protrusions being welded onto the inner circumferential surface of the case and spaced apart from one another at predetermined intervals along a circumferential direction; and
        a plurality of second protrusions located on an outer circumferential surface of the housing for support at the frame,
        wherein a number of the plurality of first protrusions equals a number of the plurality of second protrusions, and wherein the plurality of first protrusions and the plurality of second protrusions overlap each other.

2. The compression device of claim 1, wherein the first beating includes a plurality of bearing plates coupled to upper and lower sides of the cylinder shielding the compression space.

3. The compression device of claim 1, wherein a bearing protrusion is located at a center of the housing, and a bearing member is mounted in the bearing protrusion such that the crank shaft is inserted therein to be supported.

4. The device of claim 1, wherein the rotor and stator are located between the first and second portions of the crank shaft.

5. The device of claim 1, further comprising: an oil storage area within the case, wherein a passage to guide oil pumped up from the oil storage area toward the second bearing is included through the crank shaft in the axial direction.

6. The device of claim 1, wherein a difference between the outer diameter of the stator and an interior diameter of the case is less than 10% of the interior diameter of the case.

7. The device of claim 6, wherein the difference between the outer diameter of the stator and the interior diameter of the case is less than 5% of the interior diameter of the case.

8. The device of claim 1, wherein the diameter of the crankshaft is substantially constant from a first end of the stator to a second end of the stator.

9. The device of claim 8, wherein the outer diameter of the stator is substantially constant from the first end to the second end of the stator.

* * * * *